United States Patent [19]

Schonhaar et al.

[11] Patent Number: 4,541,854
[45] Date of Patent: Sep. 17, 1985

[54] ENHANCED SURFACE FIBERIZER

[75] Inventors: Werner W. Schonhaar, Forest; Keith Wallace, Corunna; Tim R. Dickson, Toronto, all of Canada

[73] Assignee: Fiberglas Canada, Inc., Toronto, Canada

[21] Appl. No.: 648,486

[22] Filed: Sep. 10, 1984

[51] Int. Cl.$^4$ .............................................. C03B 37/05
[52] U.S. Cl. .......................................... 65/15; 65/16; 65/141
[58] Field of Search .......................... 65/8, 15, 16, 141

[56] References Cited

U.S. PATENT DOCUMENTS

| | | | |
|---|---|---|---|
| 2,428,810 | 10/1947 | Powell | 65/15 X |
| 2,774,103 | 12/1956 | Graybeal | 65/15 |
| 3,159,475 | 12/1964 | Chen et al. | 65/15 |
| 3,246,971 | 4/1966 | Rudin | 65/15 |

FOREIGN PATENT DOCUMENTS 486914  9/1952  Canada .
531401 10/1958  Canada .
532046 10/1958  Canada .
699984 12/1964  Canada .

Primary Examiner—Robert Lindsay
Attorney, Agent, or Firm—Laubscher & Laubscher

[57] ABSTRACT

An apparatus for converting thermoplastic molten material stream into fibers to produce fibers, particularly to produce mineral wool from molten mineral raw material. The device combines a slinger cup wheel with a pair of fiberizing rotors. The rotors have each a concavely rounded peripheral groove. The cup wheel is virtually completely surrounded by the two grooves of the rotors so that there is no random spreading of the molten material as all of discrete, fine streams produced by the cup are attenuated by the rotors. As there is no sudden "bouncing" of the attenuated material, the invention produces an improved uniformity of the diameter of final fibres and substantially reduces the shot content in the final product. The stress to which the machinery is subjected is also limited.

6 Claims, 6 Drawing Figures

U.S. Patent   Sep. 17, 1985   Sheet 1 of 2   4,541,854
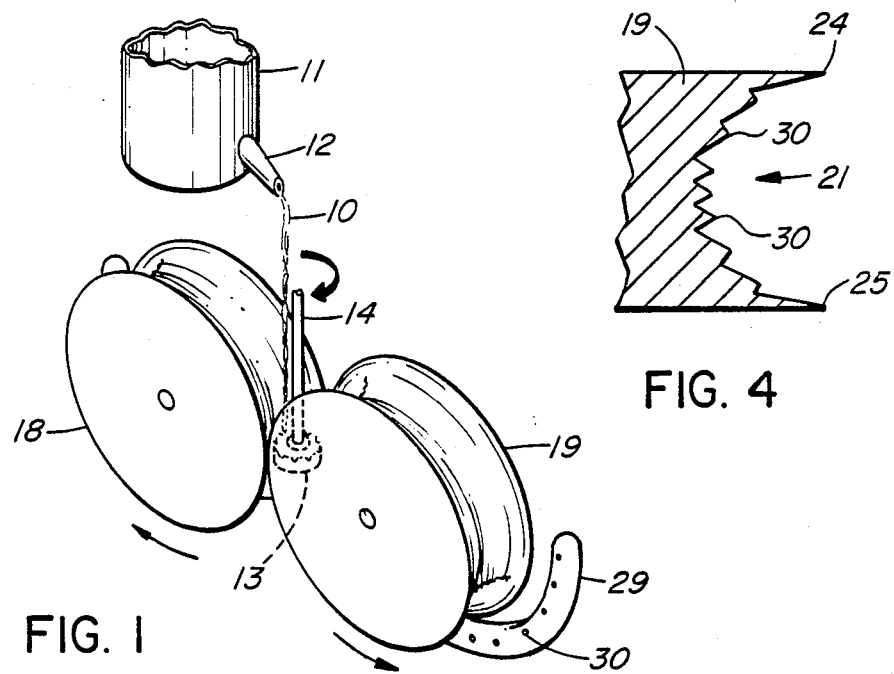
FIG. 1
FIG. 4
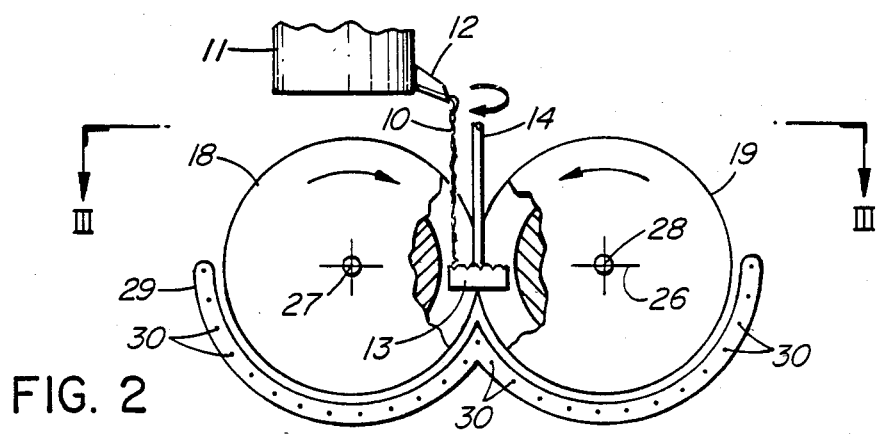
FIG. 2
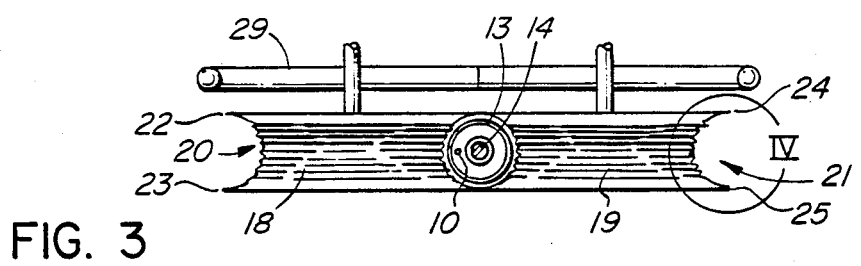
FIG. 3

4,541,854

ENHANCED SURFACE FIBERIZER

BACKGROUND OF THE INVENTION

The present invention relates, in general terms, to the art of forming fibers from a relatively thick stream of molten thermoplastic material. More particularly, the invention is concerned with the production of mineral fibers or mineral wool, for instance glass fibre insulation.

The production of mineral wool, particularly glass wool, is an important industrial field particularly due to the universally acknowledged significance of proper thermal insulation. High insulating properties, low weight and as inexpensive production as possible are obvious requirements in producing the satisfactory results.

It is well known that an ideal mineral wool would have as uniform a diameter of the fibers as possible. Furthermore, it is a requirement that the content in the wool of "shot", i.e. small solidified droplets of unfiberized material be as low as possible. It is generally acknowledged that the average diameter of the glass fiber in mineral wool should be within the range of 4–13 microns.

Mineral wool is known to be produced from a relatively thick primary stream of molten material which is subjected to different mechanical processes directed to firstly subdivide the thick stream into a plurality of relatively narrow streamlets having a smaller diameter, whereupon the material of each streamlet is subjected to attenuation usually effected by attenuating drums or the like. The use of hot air in providing the final attenuation of the formed fibers and also to remove the formed fibers from the attenuation drums or the like is also a well known practice.

The first group of prior art to which reference may be had discloses a process in which molten mineral material such as glass is applied to fiberizer drum surfaces in the form of a thick stream or streams or also in the form of large droplets which then bounce from drum to drum. The object of the arrangement is to distribute the glass uniformly over the fiberizing surfaces of the drums. The application process may also be enhanced by the use of a textured distributor role. U.S. Pat. No. 2,520,168 issued Aug. 29, 1950 to E. R. Powell, U.S. Pat. No. 3,159,475 issued Dec. 1, 1964 to A. B. Chen et al. and U.S. Pat. No. 2,758,335 issued Aug. 14, 1956 to E. R. Overman et al. present each a typical arrangement utilizing a thick stream distributed by a series of drums. A distributor disk co-operating with fiberizing drums or disks is known to enhance the acceleration and spread of the molten glass. U.S. Pat. No. 2,774,103 issued Dec. 18, 1956 to B. A. Graybeal and U.S. Pat. No. 2,577,431 issued Dec. 4, 1951 to E. R. Powell presents one embodiment wherein a distributor disk is disposed generally centrally of a series of fiberizing disks of larger diameter. Another enhancement device directed to facilitate the distribution of the thick stream of molten glass is shown in U.S. Pat. No. 2,577,431 issued Dec. 4, 1951 to E. R. Powell. In the last mentioned patent, the application enhancement device is formed by a gas jet. It is further known from the above U.S. Pat. No. 2,520,168 that if the additional stream of molten material is split in two, an additional spreading effect takes place.

It has been discovered that the mode of essentially random application of molten glass to the surface of rotating drums or disks as shown by the above prior art references results in an unsatisfactory uniformity of distribution of glass with the result that a relatively large proportion of the glass material is unfiberized.

It is further known to use so called "slinger cup" disclosed, for instance, in U.S. Pat. No. 4,111,673 issued Sept. 5, 1978 to Van Natta or U.S. Pat. No. Re. 25,306 issued Dec. 25, 1962 to J. Corsentino. The concept of the slinger cup is different from the application drums in that the slinger cup actually holds in a annular cavity in its upper face portion a volume of molten material. As the cup rotates, the material from within the cup is centrifugally forced through notches in the upper edge of the peripheral rim of the cup, thus forming a relatively thin streamlets of molten glass. The streamlets are then subjected to a blow by hot air which provides the attenuation effect. The disadvantage in the combination of a slinger cup and hot air blow is seen in that the slinger cup has to produce a relatively fine stream of molten glass. In order to assure reasonable production capacity, a high speed of the slinger cup is required to obtain the desired small diameter of the final fiber. In actual operation, therefore, the slinger cup requires very high speed of rotation and the uniformity of attenuation by blowing hot air over the formed fibers is still somewhat non-uniform.

SUMMARY OF THE INVENTION

The object of the present invention is to advance the art of converting molten mineral raw material into mineral wool, wherein the uniformity of thickness of the final fibers in the wool would be of an improved uniformity and wherein the contents of shot (solidified, relatively large particles of glass) within the formed wool would be at least reduced in comparison with the production by any of the above two known methods.

In general terms, the present invention provides apparatus for converting molten raw material into mineral wool, comprising, in combination, a molten raw material stream supply means including discharge means for generating a stream of a molten mineral material; a distributor cup wheel operatively associated with said discharge means and adapted to be driven to rotate about an axis of rotation, said distributor cup having a concave face provided with an annular cavity for receiving the molten raw material, and a peripheral rim limiting the annular cavity, said rim being provided with a plurality of generally radially outwardly directed discrete flow passages; at least two fiberizing rotors, each having a concavely rounded peripheral groove, said rotors being adapted to be driven for rotation and being each adapted to rotate within a plane generally perpendicular to the plane of rotation of said cup, said rotors being so arranged and disposed relative to the distributor cup that the peripheral grooves generally entirely surround the peripheral rim at a plane perpendicular to the axis of rotation of the cup and generally coincident with the discrete flow passages.

In a preferred embodiment, the apparatus further comprises fluid blast means disposed such as to attenuate the raw material deposited on the periphery of the respective rotor in order to remove formed fibers from the surface of the rotor. According to a further preferred feature of the invention, the axes of rotation of the rotors are generally parallel with each other. The surface of each of the concavely rounded peripheral grooves is preferably provided with a plurality of closely spaced ridges extending in the direction of rotation of the respective fiberizing rotor. In a particularly preferred embodiment, only two fiberizing rotors are provided which are so arranged that their axes of rotation define a plane generally coincident with a plane in which said discrete flow passages are located.

BRIEF DESCRIPTION OF THE DRAWINGS

The invention will now be described by way of a preferred and an exemplary embodiment with reference to the accompanying simplified, diagrammatic drawings, wherein:

FIG. 1 is a simplified, diagrammatic, perspective view of a preferred embodiment of the invention, with obvious structural parts of the device such as drive motors, bearings, etc. omitted for the sake of clarify;

FIG. 2 is a front view of the device of FIG. 1;

FIG. 3 is a top plan view of FIG. 1, with certain parts of FIG. 1 omitted;

FIG. 4 is detail IV of FIG. 3;

DETAILED DESCRIPTION OF A PREFERRED EMBODIMENT AND OF AN EXEMPLARY EMBODIMENT

Figure 5:
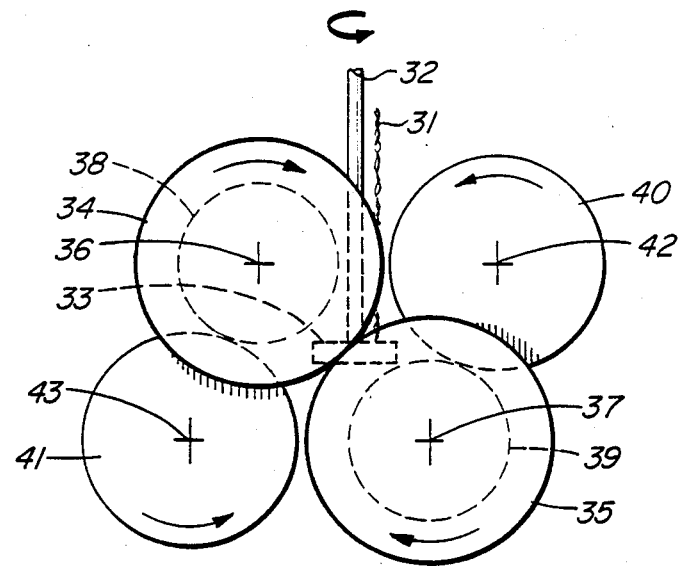
FIG. 5 is a view similar to that of FIG. 2 but showing a modified embodiment of the invention.
Figure 6:
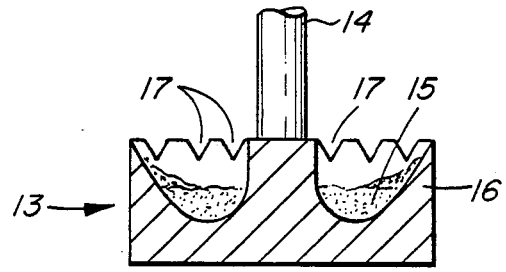
FIG. 6 is a diagrammatic representation, partly in section, of a slinger cup used in the invention.

Turning firstly to FIG. 1, reference numeral 10 denotes a relatively thick molten glass stream flowing generally vertically downwardly and originating in a suitable device such as a melting furnace 11 provided with a discharge spout 12, as is well known in the art. The stream 10 terminates in the upper surface of a slinger cup 13 whose structural configuration is apparent from the simplified cross-sectional view of FIG. 5. The cup is suspended on a driven shaft 14 for rotation in a horizontal plane as best seen from FIG. 3. As is well known from the art of slinger cups, the rotating cup 13 holds a generally uniform volume or deposit 15 of molten glass constantly replenished by the stream 10. As the cup 13 rotates, the centrifugal force acts on the deposit 15 forcing it towards the outer wall 16 and through a number of notches 17 provided in the top of the rim 16 and directed generally radially outwardly. The notches 17 form a preferred embodiment of what is generally referred to as "a plurality of generally radially directed discrete flow passages".

The embodiment of FIGS. 1, 2 and 3 further includes two fiberizing rotors 18, 19 mounted for driven rotation in suitable bearings, etc. The shafts of the rotors and the corresponding bearings do not have to be shown since their particular arrangement does not form a part of the invention and presents arrangement which is well known in the art. The rotor 18 has a concavely rounded peripheral groove 20 and the rotor 19 has a similar concavely rounded peripheral groove 21. The radius of grooves 20, 21 is preferably only very slightly larger than the radius of the outer surface of the slinger cup 13. The rotors 18 and 19 are so arranged that the rims 22, 23 forming axial limits of the groove 20 are very close to the corresponding rims 24, 25 of the rotor 19. Accordingly, except for a very narrow gap between the rims 22–24 and 23–25, the slinger cup 13 is entirely surrounded by a circular space defined by the two grooves 20, 21, as best seen from FIG. 1. It is obvious from review of FIGS. 1 and 2, that in the preferred embodiment, the cup 13 is adapted to rotate in a generally horizontal plane 26 which is the plane of coincidence of the notches 17 of the cup 13 and also of axes 27, 28, of rotation of the rotors 18, 19. A jet manifold 29 has generally the shape of numeral "3" surrounding, in a front view, the lower margins of the rotors 18 and 19 in a concentric fashion as best seen in FIG. 2 but slightly offset backwards (see FIG. 3). The manifold 29 is supplied with a high pressure gas such as hot air which is discharged at high velocity from a number of jets 30 directed axially with respect to the associated rotors 18, 19.

The surfaces of the concave grooves of the rotors are provided with ridges so that the streamlets will stick at discrete points, resulting in streamlet segments anchored to the surfaces at the "sticking" points.

In operation, the flow 10 is directed into the cup 13 which converts the thick stream 10 into a number of thinner flows passing through the notches 17 and becoming deposited within the respective concave grooves 21 to become attenuated by the respective rotors 18, 19. The attenuation of the fibers results in that the respective fibers form a number of "loops" which are virtually immediately subjected to the action of the blow at the area where the two arches of the manifold 29 meet, i.e. at a point virtually coincident with the centre plane between the two rotors 18 and 19. The individual fibers are attenuated uniformly in an axial direction (downwardly of FIG. 3) until the formed fibers eventually become removed by the air blast from the surface of the respective grooves 20, 21 near the free ends of the manifold 29. The attenuation is uniform as none of the material thrown out from the cup 13 becomes subject to a random processing which might result in the formation of "shot" or solidified glass droplets. The combination of the cup 13 with rotors 18 and 19 also results in that the speed of the rotation of the cup 13 can be much lower than that of the known slinger cups combined with air blast devices without any intermediate mechanical arrangement. This means less stress on a vital part of the machinery with the resulting reduction of the production costs and of the maintenance of the device.

Turning now to the exemplary representation of a modified device of the present invention as shown in FIG. 5, the arrangement of the source of a thick glass stream 31 is as in FIG. 1. The furnace and its discharge is not shown in the drawing. Reference numeral 32 designates a shaft similar to the shaft 14 of the preferred embodiment of FIG. 1. Item 33 is a diagrammatic representation of a slinger cup. The operation of the slinger cup and the structural features of its associated parts are the same as in the embodiment of FIG. 1. However, the rotors 34, 35 are disposed such that the plane of coincidence of their axes 36, 37 is oblique angle with respect to the axis of rotation of the slinger cup 33. As in the case of rotors 18, 19, the rotors 34, 35 are each provided with a concavely curved peripheral groove 38, 39. The grooves 38, 39 are generally complementary with convexly rounded exterior surface of supplementary attenuation drums 40, 41 rotatable about discrete axes 42, 43, respectively. The convex drums 40, 41 thus co-operate with the respective rotors 35, 34 to enclose the space around the level of discharge of streamlets from the slinger cup 33 as shown in FIG. 5. The device would normally be further accompanied by a jet manifold which would surround virtually the entire assembly of the four elements 34, 35, 40, 41, to remove the attenuated glass fibers from the rotating parts 34, 35, 40 and 41. The exemplary embodiment of FIG. 5 demonstrates that it is possible to utilize the basic features of the present invention, namely the combination of a slinger cup with a mechanical attenuation device, without having to strictly adhere to the structural features as shown in the series of FIGS. 1 and 2.

Many further embodiments of the present invention may exist which would depart from the preferred embodiments shown in FIGS. 1 or 4 and described above, without departing from the present invention as set forth in the accompanying claims. Also, while the apparatus is described for use in producing mineral wool, it will be appreciated that the inventive device as claimed can be used in a different field.

We claim:

1. Apparatus for converting molten thermoplastic raw material into fibers, particularly in the production of mineral wool from molten raw material, said apparatus comprising, in combination:
(a) a molten raw material stream supply means including discharge means for generating a stream of a molten material;
(b) a distributor cup wheel operatively associated with said discharge means and adapted to be driven to rotate about an axis of rotation, said distributor cup having a concave face provided with an annular cavity for receiving the molten raw material, and a peripheral rim limiting the annular cavity, said rim being provided with a plurality of generally radially outwardly directed discrete flow passages;
(c) at least two fiberizing rotors, each having a concavely rounded peripheral groove, said rotors being adapted to be driven for rotation and being each arranged to rotate within a plane generally perpendicular to the plane of rotation of said cup, said rotors being so arranged and disposed relative to the distributor cup that the peripheral grooves generally entirely surround the peripheral rim at a plane perpendicular to the axis of rotation of the cup and generally coincident with the discrete flow passages.

2. Apparatus as claimed in claim 1, further comprising fluid blast means disposed such as to attenuate the raw material deposited on the periphery of the respective rotor and to remove formed mineral fibers from the surface of the rotor.

3. Apparatus as claimed in claim 1, wherein the axes of rotation of said rotors are generally parallel with each other.

4. Apparatus as claimed in claim 1, wherein the surface of each concavely rounded peripheral grooves is provided with a plurality of closely spaced ridges extending in the direction of rotation of the respective fiberizing rotor.

5. Apparatus as claimed in claim 1, wherein the axes of rotation of the fiberizing rotors define a plane generally coincident with a plane in which said discrete flow passages are located.

6. Apparatus as claimed in claim 1, wherein said fiberizing rotors are primary rotors, each primary rotor being associated with a supplementary fiberizing rotor, each supplementary fiberizing rotor having a convexly rounded periphery of a radius generally corresponding to that of the associated primary rotor.

* * * * *